United States Patent
Perroni et al.

(10) Patent No.: US 8,423,701 B2
(45) Date of Patent: Apr. 16, 2013

(54) FLASH MEMORY DEVICE WITH A LOW PIN COUNT (LPC) COMMUNICATION INTERFACE

(75) Inventors: Maurizio Francesco Perroni, Furnari (IT); Bruno Calandrino, Palermo (IT)

(73) Assignee: Micron Technology, Inc., Boise, ID (US)

(*) Notice: Subject to any disclaimer, the term of this patent is extended or adjusted under 35 U.S.C. 154(b) by 1086 days.

(21) Appl. No.: 11/261,131

(22) Filed: Oct. 28, 2005

(65) Prior Publication Data

US 2006/0095650 A1 May 4, 2006

(30) Foreign Application Priority Data

Oct. 29, 2004 (IT) .............................. MI2004A2072

(51) Int. Cl.
*G06F 12/00* (2006.01)
(52) U.S. Cl.
USPC .................................. 711/103; 711/E12.008
(58) Field of Classification Search .................... 711/103
See application file for complete search history.

(56) References Cited

U.S. PATENT DOCUMENTS

| 5,911,058 | A | * | 6/1999 | Ogawa | 712/219 |
| 6,377,492 | B1 | * | 4/2002 | Rong et al. | 365/189.02 |
| 6,785,174 | B2 | * | 8/2004 | Messina et al. | 365/201 |
| 2001/0035866 | A1 | * | 11/2001 | Finger et al. | 345/568 |
| 2002/0145909 | A1 | * | 10/2002 | Maone et al. | 365/185.21 |
| 2003/0005231 | A1 | * | 1/2003 | Ooi et al. | 711/131 |

* cited by examiner

*Primary Examiner* — Charles Rones
*Assistant Examiner* — Aracelis Ruiz
(74) *Attorney, Agent, or Firm* — Dorsey & Whitney LLP (57) ABSTRACT

The Flash memory device with a Low Pin Count (LPC) communication interface includes a memorization block or Flash core including a matrix of non volatile memory cells, with associated circuit portions for reading, modifying and erasing the data contained in the memory. An interface block associated with the LPC communication interface includes at least an address block, a data block and a state machine enabling the data flow from and towards the memorization block. Advantageously, the data block of the interface block is doubled in a portion provided to contain the read data and in a portion provided to contain write data. In the memorization block, respective address decoders are provided for the read and write steps of the memory matrix. The device includes an architecture of the multibank type and the logic necessary for the execution of a "Dual Operations" mode. In this way it is possible to simultaneously perform a modify operation in a memory bank and a read operation in another bank.

11 Claims, 8 Drawing Sheets

FLASH MEMORY DEVICE WITH A LOW PIN COUNT (LPC) COMMUNICATION INTERFACE

FIELD OF THE INVENTION

The present invention relates to semiconductor memories, and more particularly to an electronic memory device including a Low Pin Count (LPC) type serial interface.

BACKGROUND OF THE INVENTION

The invention relates to a Flash memory for standard applications, integrated with a LPC interface block and of the type comprising a memory block or Flash core which includes a matrix of non-volatile memory cells, with associated circuit portions for reading, modifying and erasing the data contained in the memory, and an interface block associated with the LPC communication interface and comprising at least an address block, a data block and a state machine which enables the flow of data from and towards the memory block on respective address bus and data bus. The applicable integrated electronic memory device is a non-volatile memory of the Flash EEPROM type to be installed on a motherboard for PC applications on a PCI bus and it has eleven external address pins, eight data pins and some control pins among which the synchronism or clock signal CLK and a setting signal of the two IC interfaces.

Typically, the memory device is provided with two communication interfaces: a parallel or pseudo-parallel interface, such as A/Amux interface, and a serial or LPC interface. The first one is thought to perform quick pre-programming and testing operations whereas the second one is used during the normal operation of the personal computer according to a well established communication protocol. A selection signal, called IC, which allows to switch from an operation interface to the other one is provided. All the addresses and all the data considered are managed in a parallel mode, whereas only the clock signal CLK and other four control pins are necessary for the communication serial protocol.

Figure 1:
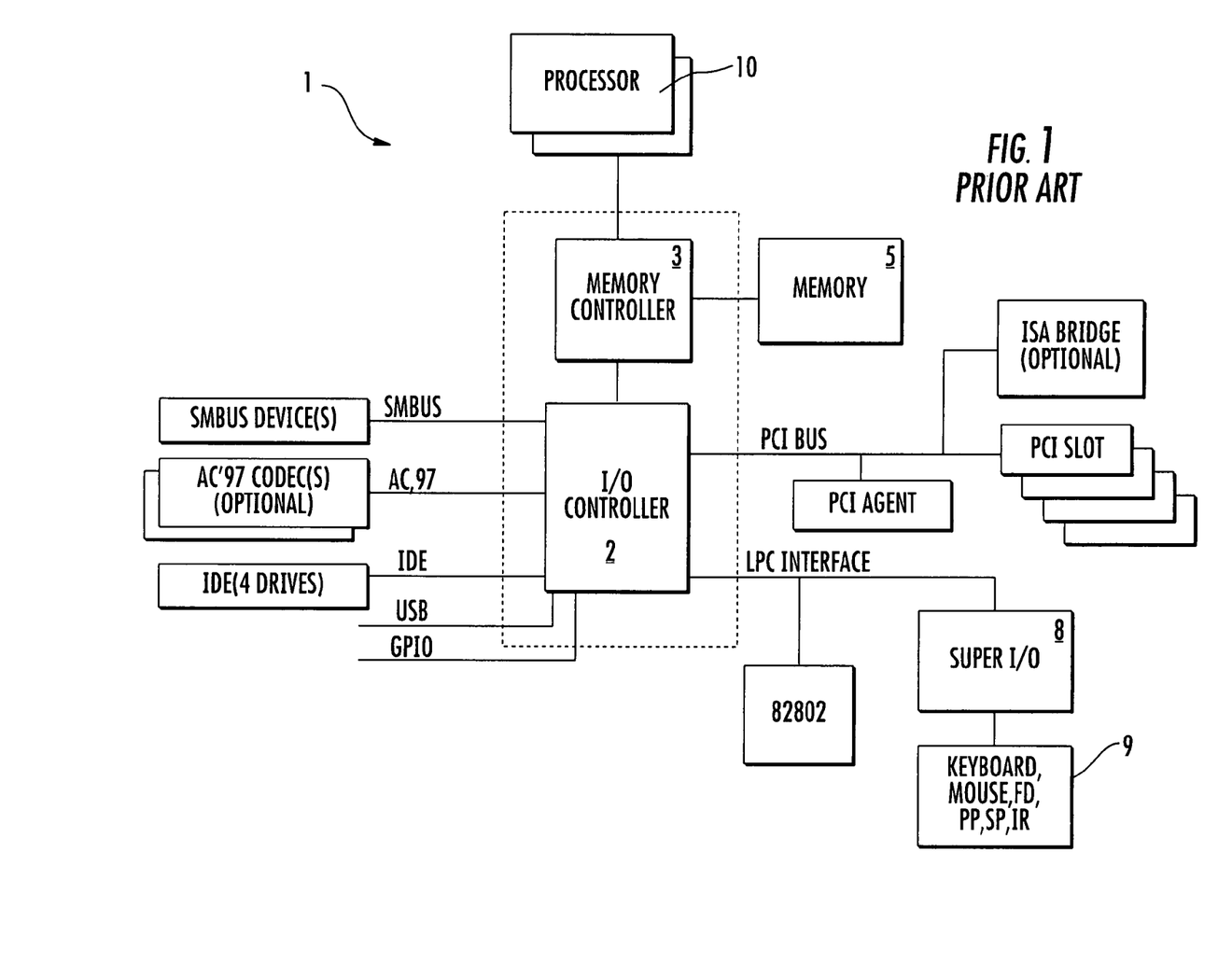
FIG. 1 is a schematic block diagram showing the structure of a motherboard of a computer of the PC type incorporating a Flash memory device with a Low Pin Count communication interface, in accordance with the prior art.

FIG. 1 schematically shows the structure of a motherboard of a computer 1 of the PC type. As seen in FIG. 1, the blocks 2 and 3, labeled I/O Controller and Memory Controller, are provided to put a processor 10 of the motherboard and the system peripherals 6, 7 in communication with a memory 5, where the device operative system BIOS is stored; this occurs for each type of operation. The other blocks 8, 9 of the system are those allowing the computer 1 to interface with the external world and they are here highlighted only by way of description.

Figure 2:
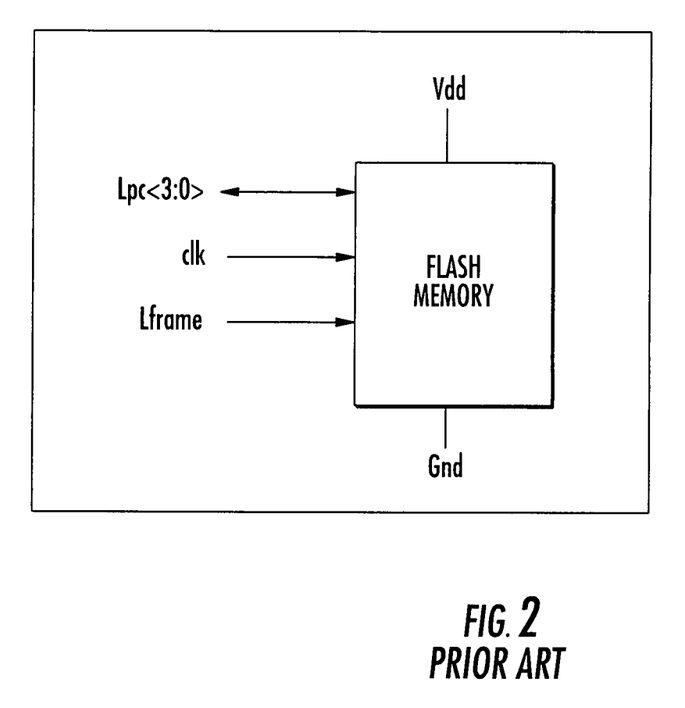
FIG. 2 is a schematic block diagram showing a memory device to which the present invention is applied.

In this specific technical field it is well known that the read operation of a memory location of a cell matrix first implies the passage of the address of the location itself. The block provided for the management of the addressing in the available memory space is the Memory Controller 3. FIG. 2 shows a block scheme of a memory device to which the present invention is applied. Such a device, inserted and supplied between two voltage references Vdd and GND, has four Input/Output Lpc <3:0> pins through which all information are exchanged and a further pin called Lframe which allows to enable the memory to receive the protocol, besides a clock pin.

Figure 3:
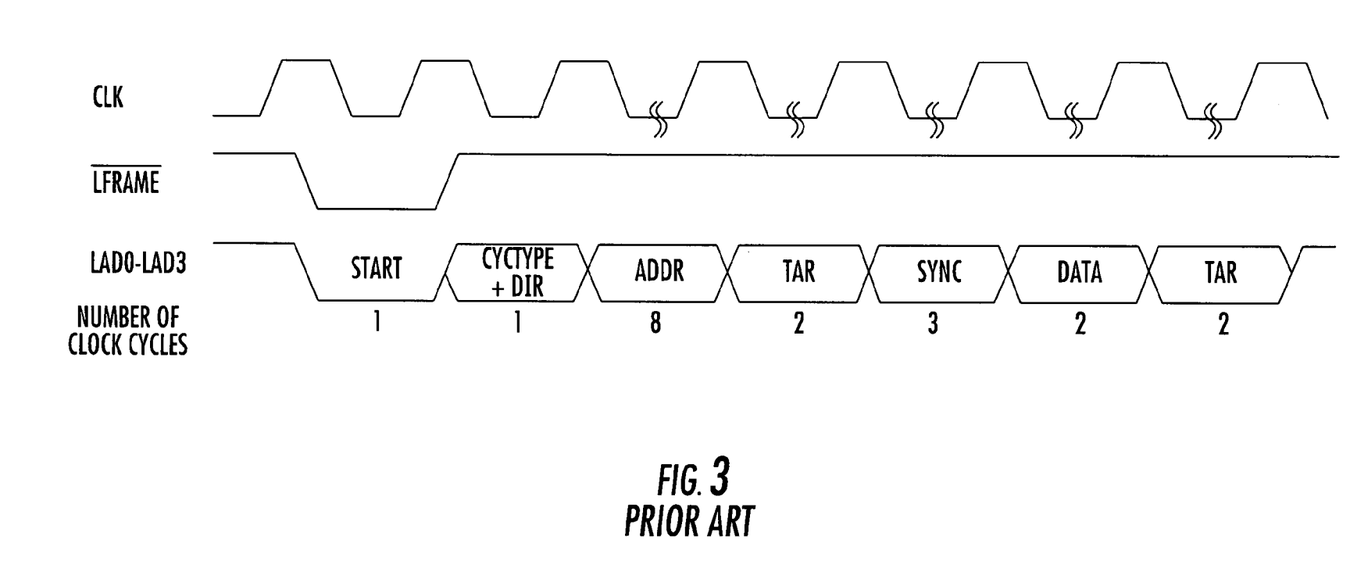
FIG. 3 is a timing diagram showing the pattern of the timing signals for the execution of a read operation of the memory of FIG. 2 according to a Low Pin Count mode.
Figure 4:
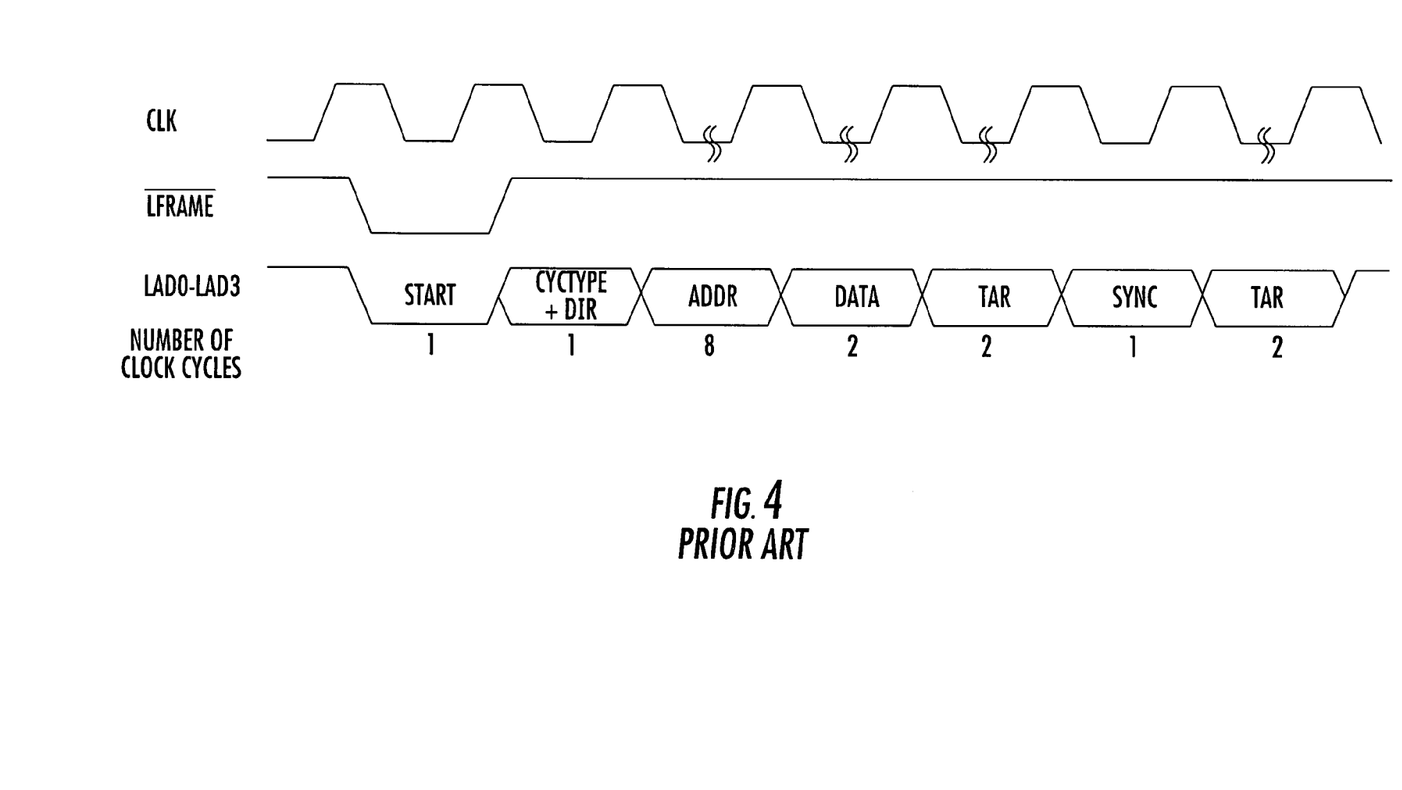
FIG. 4 is a timing diagram showing the pattern of timing signals for the execution of a write operation of the memory of FIG. 2 according to a Low Pin Count mode.

FIG. 3 shows the pattern in time of the timing signals for the execution of a read operation (Read) of the memory in the Low Pin Count mode. Similarly, FIG. 4 shows the pattern in time of timing signals for the execution of a write operation (Write) of the memory in the Low Pin Count mode. During the period when the Lframe signal is low, the Start command is decoded, a Cycle Type cycle follows which distinguishes between the request for a read operation (Read) and a write one (Write). The successive eight clock counts are dedicated to the address memorization.

In a Read operation there are thus two signal cycles Tar during which the system host transfers the external bus control to the memory, which, to synchronize the output data, generates Sync cycles before the real data. The operation ends with two further cycles Tar during which the memory transfers again the bus control to the host.

In a Write operation, instead, after having supplied it with the memory addresses, the system host supplies the memory with two nibbles of the data to be programmed. The system host will thus transfer the control to the memory during two Tar cycles. The memory starts then the inner write operations and responds on the buses with a wait cycle (Sync) and further Tar cycles for transferring again the bus control.

The device of the prior art is characterized by an architecture of the single bank type which allows to perform one operation at any one time, in the sense that if during a modify operation the user would go and read a memory location he would have to first interrupt the on-going modify operation and immediately perform the read operation. This limits the device and makes the device inflexible.

Figure 5:
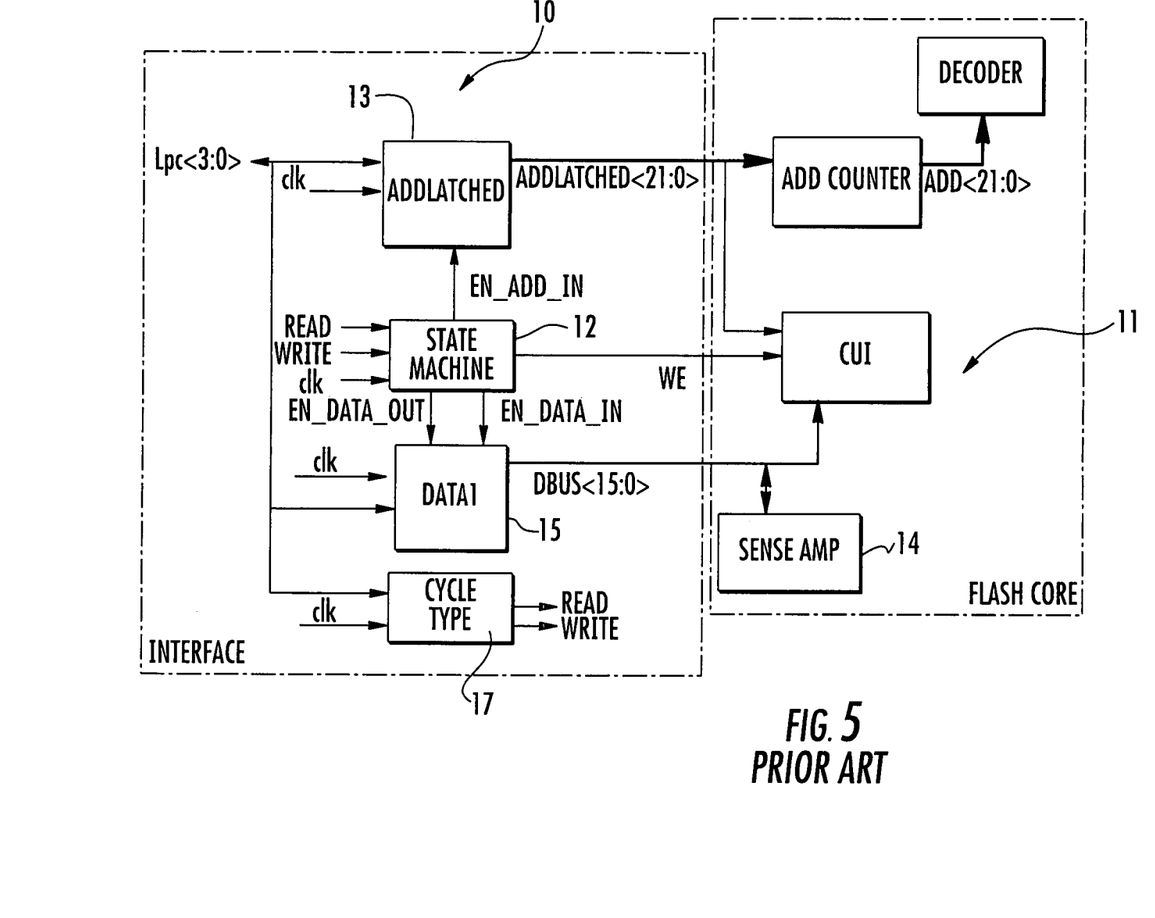
FIG. 5 is a schematic block diagram showing a memory device according to the prior art.

FIG. 5 shows a block scheme of the architecture of a device according to the prior art and operating as previously described. Two main macro blocks can be distinguished, the interface block 10 and that of a standard Flash memory 11 here called Flash Core. In the interface 10, a block 17 Cycle Type receives the clock signal and the information inputs Lpc<3:0> and it distinguishes between a read and a write request, these information being passed to an inner state machine 12 provided to scan the various steps of the communication protocol. This state machine 12 generates the enable signal which allows the addresses memorized in the block 13 Addlatched to transfer an enable signal for the data and a write enable signal into the Flash core 10.

The data being read come from a read amplifier 14, or SenseAmp, to a DataI block 15 to be memorized and then sent out synchronized with the clock, those being written instead are first memorized in the DataI block and then sent into the Flash core to go to the CUI (Command User Interface) block if it is a command or directly to the Sense Amps in case it is information to be programmed.

Figure 6:
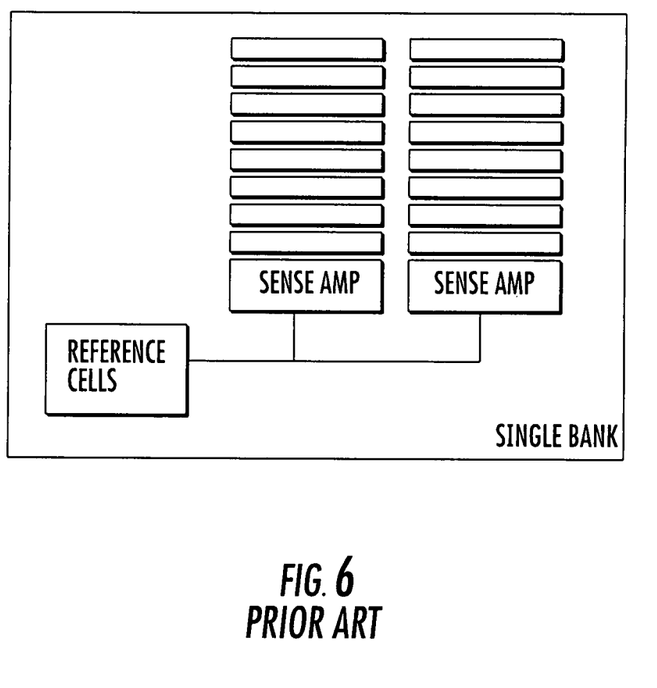
FIG. 6 is a schematic block diagram showing a memory device according to the prior art including the sense amplifiers each being associated with a half-matrix of cells.

FIG. 6 finally shows the schematic structure of a memory device of the known single bank type wherein the sense amplifiers are highlighted each one being associated with a half-matrix of cells. The presence is to be noted of a single block of reference cells to be used by both the half-matrixes, the right one and the left one.

The technical problem underlying the present invention is that of providing a memory electronic device with a serial interface of the LPC type and having such structural and functional characteristics as to allow to accede to the memory in an independent way to simultaneously perform read and write operations overcoming the limits of the known approaches.

SUMMARY OF THE INVENTION

An object of the present invention is that of providing a more flexible memory device being suitable to operate in a wide-range of applications.

The present invention includes adopting an architecture of the multibank type and, consequently, of providing the logic necessary for the execution of a "Dual Operations" mode, i.e.

making the simultaneous execution of a modify operation in a memory bank and a read operation in another bank of the same memory possible.

Accordingly, the present invention provides an electronic memory device with an LPC interface including a memorization block or Flash core including a matrix of non volatile memory cells, with associated circuit portions for reading, modifying and erasing the data contained in the memory. An interface block associated with the LPC communication interface includes at least an address block, a data block and a state machine enabling the data flow from and towards the memorization block. Advantageously, the data block of the interface block is doubled in a portion provided to contain the read data and in a portion provided to contain write data. In the memorization block, respective address decoders are provided for the read and write steps of the memory matrix.

BRIEF DESCRIPTION OF THE DRAWINGS

The characteristics and advantages of the device according to the invention will be apparent from the following description of an embodiment thereof given by way of indicative and non limiting example with reference to the drawings.

DETAILED DESCRIPTION OF THE PREFERRED EMBODIMENTS

Figure 7:
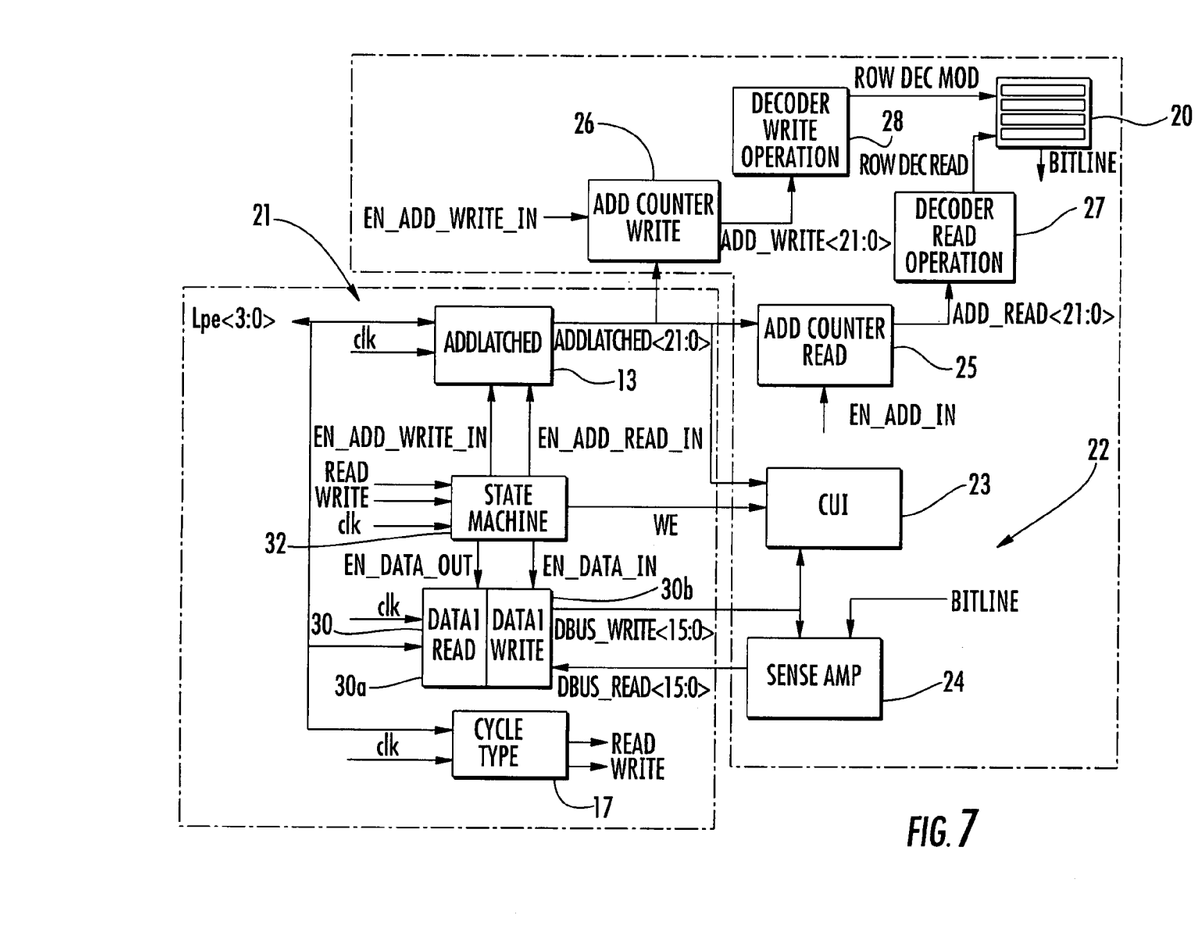
FIG. 7 is a schematic block diagram showing a memory device according to the present invention.

With reference to these figures, and in particular to the example of FIG. 7, an electronic memory device monolithically integrated on semiconductor and realized according to the present invention with a Low Pin Count communication interface is globally and schematically indicated at 20. The device 20 is preferably of the Flash EEPROM type and it comprises a matrix of non-volatile memory cells organized in rows and columns. The inventive features can also be applied to other memory devices that include a serial interface of the LPC type, i.e. of the Low Pin Count type.

The device 20 comprises a matrix of non-volatile memory cells and corresponding row and column decoding circuits, as well as circuit portions for reading, modifying and erasing the data contained in the memory, which are not shown in detail but are appreciated by those skilled in the art. Moreover, the device 20 comprises several blocks and circuit components, described hereafter and conceptually divided into two functional macro blocks, one interface block 21 and a memory block 22, called Flash Core.

The circuit blocks are interconnected via a set of bus connections. In particular, an address memorization block 13 is provided, connected with the matrix via an address bus AddLatched, and a data memorization block 30, in turn provided in connection with the matrix via a data bus Dbus. External data coming from the LPC interface are loaded in the block 30. The data are loaded in the memory during the data cycles in the memory locations defined by the content of the block of addresses which are transmitted to the memory during the addressing cycles.

Advantageously, the structure of the device 20 is of the multibank type, i.e. it comprises a plurality of memory cells banks being structurally independent from one another. In the embodiment here described by way of indicative and non limiting example, the banks are at least two and they can be distinguished in FIG. 8 as bank 0 and bank 1. In the description of the device 20 according to the invention reference will be made to co-operating details and parts having the same structure and operation of similar details as those in the device of FIG. 5 according to the prior art. For such details the same reference numbers will be used.

In the interface 21, a selection block 17 Cycle Type receives the clock signal and the information inputs Lpc<3:0> from the LPC interface and it distinguishes between a read request and a write one, these information being passed to an inner state machine 32 provided for scanning the various steps of the communication protocol. This state machine 12 generates an enable signal which allows the addresses memorized in the block 13 Addlatched to transfer, into the Flash core 22, an enable signal for the data and the state machine 32 to transfer a write enable signal WE. This signal WE is received by the matrix 23 indicated with the acronym CUI.

The data being read come from a block 24 of read amplifiers, or Sense Amplifiers, to the data block 30 DataI which is advantageously doubled in two associated blocks 30a and 30b, respectively DataI Read and DataI Write, one provided for the read operations and the other for the write operations. The data processed in the block 30 are ready for being memorized and for being sent outwards of the memory device 20, being synchronized with the clock signal CLK. During the write step, the data are instead first memorized in the portion 30b of the block 30 DataI and then transferred into the Flash core 22 in the block CUI.

In practice, the DataI data block has been doubled, the block comprising a sub-block for the Read step, which will use a bus Dbus_Read, and a sub-block for the Write step, which will use instead a bus Dbus_Write. The state machine 32 will be the one which will enable the one 30a rather than the other 30b according to the operations required by the user.

In essence, the approach proposed by the present invention provides the device 20 with a multibank architecture and with the logic necessary for the execution of the "Dual Operations" mode. In this way, it is possible to simultaneously carry out a modify operation in a memory bank, for example bank 0, and a read operation in another bank, for example bank 1. The object has been reached by bringing substantial modifications both in the interface macro-block 21 and in the Flash core macro-block 22.

At the level of the interface 21 the structural and functional doubling of the data block, DataI, has been provided, which is subject to distinguishing between a Read operation and a Write one. At the level Flash Core 22 there are memory banks able to operate in a completely independent way in the new mode due to a doubling of the blocks provided for the address management.

FIG. 7 shows the resulting structure in detail. As it can be appreciated, the insertion is provided of a further address counter AddCounter with corresponding address decoder at the Flash Core 22 level. More in particular, the blocks provided for the write and read operations have been doubled providing such a pair of address counter and decoder as to distinguish the two Read or Write operations.

In fact, the block 25 AddCounter Read is associated with a decode block 27 for the Read operations, whereas the block 26 AddCounter Write is associated with a decode block 28 for the Write operations. In substance, the addresses, after having been made parallel to an interface 21 level, will be memorized in the Flash Core 22 in one of the two blocks 25 or 26 according to the required operation.

Figure 8:
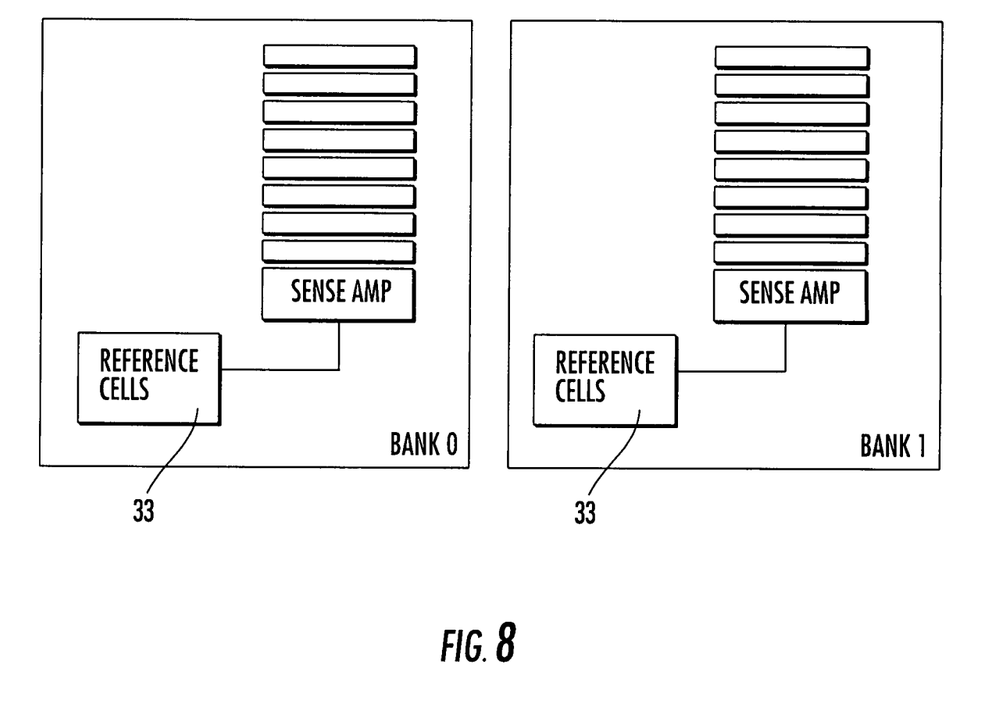
FIG. 8 is a schematic block diagram showing the device of FIG. 7 wherein the individual blocks are highlighted, each being equipped with a corresponding sense amplifier.

FIG. 8 shows, with schematic blocks, the new architecture of the device 20, where the presence of a block 33 of reference cells for each memory bank is to be noted. Of course, the number of banks depends on the dimensions of the memory at issue. The new memory device is thus able to perform Dual Operations and, more precisely, reading in a bank with simultaneous writing in another bank.

The present invention is much more flexible since it creates two big memory areas, one being usable for example for memorizing machine code and one for memorizing the data, for example. It will be possible to perform the code and to modify data simultaneously without adopting a mechanism known as "Suspend" of the operation in course. The device has the advantage of being thus much more flexible for the external user and it will be used in a much wider application field.

That which is claimed is:

1. A memory device with a Low Pin Count (LPC) communication interface, comprising:
   a memory block, including:
      a write address decoder;
      a read address decoder; and
      a matrix of non-volatile memory cells and associated circuits for reading, modifying and erasing data in the memory block, the matrix divided into functionally independent, simultaneously accessible memory banks independently accessible by the write and read address decoders, each of the banks including a set of reference cells;
   an address bus;
   a data bus; and
   an interface block associated with the LPC communication interface and comprising an address block, a data block and a state machine to control the flow of data to and from the memory block over the address bus and data bus;
   wherein the data block includes a read data sub-block and a write data sub-block, the read data sub-block and write data sub-block each configured to be selectively enabled by the state machine.

2. The memory device according to claim 1, wherein the memory block further comprises:
   a read address counter block associated with the read address decoder; and a write address counter block associated with the write address decoder.

3. The memory device according to claim 2, wherein the memory block further comprises:
   a read amplifier block associated with the memory matrix; and
   a reference cell block associated with each memory bank.

4. The memory device according to claim 3, wherein the interface block further comprises an address block; and the address bus is branched from the address block to the read address counter block and the write address counter block.

5. The memory device according to claim 2, wherein the interface block further comprises a state machine to enable one of the read data sub-block and the write data sub-block of the data block based upon read/write operations of the memory matrix.

6. The memory device according to claim 1, wherein the interface block further comprises a selection block to receive input signals from the LPC interface and generate respective read and write signals for the memory device.

7. A method of making a memory device with a Low Pin Count (LPC) communication interface, the method comprising:
   providing a memory block including a matrix of non-volatile memory cells and associated circuits for reading from, writing to, and erasing data on the memory block and write address decoding and read address decoding;
   providing an interface block associated with the LPC communication interface to control the flow of data to and from the memory block over an address bus and data bus, including providing a data block comprising a read data sub-block and a write data sub-block, the read data sub-block configured to be selectively enabled when data is read from the memory block and the write data sub-block configured to be selectively enabled when data is written to the memory block; and
   dividing the memory matrix into functionally independent, simultaneously accessible memory banks independently accessible by the write and read address decoding circuits, each of said banks including a set of reference cells.

8. The method according to claim 7, wherein the memory block further comprises:
   a read address counter block associated with the read address decoding circuit; and a write address counter block associated with the write address decoding circuit.

9. The method according to claim 8, wherein the interface block further comprises an address block; and the address bus is branched from the address block to the read address counter block and the write address counter block.

10. The method according to claim 7, wherein the interface block further comprises a state machine to enable one of the read data sub-block and the write data sub-block of the data block based upon read/write operations of the memory matrix.

11. The method according to claim 7, wherein the interface block further comprises a selection block to receive input signals from the LPC interface and generate respective read and write signals for the memory device.

* * * * *